United States Patent [19]

Weisner et al.

[11] 4,352,776

[45] Oct. 5, 1982

[54] APPARATUS AND METHOD FOR FABRICATING POLYCARBONATE SKYLIGHTS

[75] Inventors: Kent A. Weisner, Altamonte Springs; Lester L. Walls, Jr., Winter Park, both of Fla.

[73] Assignee: Kenergy Corporation, Orlando, Fla.

[21] Appl. No.: 230,317

[22] Filed: Feb. 2, 1981

Related U.S. Application Data

[63] Continuation-in-part of Ser. No. 12,822, Feb. 16, 1979, Pat. No. 4,278,414.

[51] Int. Cl.$^3$ .............................................. B29C 17/00
[52] U.S. Cl. ................................... 264/522; 264/2.7; 264/292; 264/322; 264/553
[58] Field of Search ............... 264/522, 544, 553, 554, 264/2.7, 292, 322

[56] References Cited

U.S. PATENT DOCUMENTS

| | | | |
|---|---|---|---|
| 2,444,420 | 7/1948 | Borkland | 264/292 |
| 2,886,828 | 5/1959 | Lattuca | 264/322 |
| 3,025,566 | 3/1962 | Kostur | 425/DIG. 48 |
| 3,553,784 | 1/1971 | Shurman | 264/322 |
| 3,599,959 | 8/1971 | Asenbauer | 425/472 |
| 3,632,275 | 1/1972 | Misner | 264/554 |

Primary Examiner—James B. Lowe
Attorney, Agent, or Firm—Duckworth, Allen, Dyer & Pettis

[57] ABSTRACT

A method for molding a polycarbonate plastic sheet into a skylight dome or the like. A clamp frame is preheated to a first temperature. A polycarbonate plastic sheet is thereafter clamped around its perimeter in the preheated clamp frame and preheated to approximately the first temperature. The unclamped portion of the plastic sheet is heated to about 300° by ovens to soften the plastic for forming. The softened plastic sheet is then subjected to forming by a pair of coacting peripheral heated molds to form steps and pushes in the plastic sheet immediately adjacent to the clamp frames. A vacuum is drawn over the center portion of the sheet to free-form a dome. The molds are separated and the formed article is removed from the heated clamp frame. The steps of preheating the plastic sheet perimeter in the heated clamp frame and heating of the peripheral molds prevents distortion of the flange area of the slylight dome and of the step and push areas of the dome.

11 Claims, 9 Drawing Figures

APPARATUS AND METHOD FOR FABRICATING POLYCARBONATE SKYLIGHTS

This application is a continuation-in-part of co-pending application, Ser. No. 12,822, filed Feb. 16, 1979 now U.S. Pat. No. 4,278,414 issued July 14, 1981.

BACKGROUND OF THE INVENTION

1. Field of the Invention

The present invention relates to methods for making skylights, and more particularly to methods for forming skylights from polycarbonate plastic sheets.

2. Description of the Prior Art

In the past, a variety of skylights have been available which are typically formed from thin sheets of a transparent plastic polymer material. A sheet is clamped in a frame, heated, and vacuum formed to produce a dome. Such skylights may be attached either directly to a flat portion of a roof by a perimeter flange, or alternatively, attached to a curb formed in the roof. It has been common to utilize plastics such as the acrylics and butyrates for these prior art skylights. These types of plastic sheet used in the prior art skylights are noncritical with respect to forming and molding. For example, a sheet of acrylic plastic may be clamped in a clamping frame, the assembly heated by means of an oven or the like, and thereafter formed by molds or vacuum forming. There are few if any problems due to warping of flanges, or to rapid cooling of the plastic during the molding process. Apparently, the acrylic plastics have a relatively high heat retaining capability and will therefore remain soft and plastic over a sufficiently long time to permit completion of the molding operation. One major disadvantage of the acrylic and butyrate type skylights is a lack of mechanical strength which presents difficulty in meeting national building codes and the Underwriters Laboratory standards for burglary resistance.

Prior art apparatus and machines for vacuum forming of skylight dome elements are exemplified by U.S. Pat. No. 3,025,566 to Kostur in which an adjustable clamping frame is mounted in a carriage which permits a plastic sheet clamped in the frame to be moved between an upper and lower oven box for heating of the sheet. After heating, the carriage is moved back to its loading position and a set of platens closed on the sheet, vacuum applied to one side of the sheet and the desired shape thus vacuum formed. A rotary adjustable clamping frame is disclosed by Asenbauer in U.S. Pat. No. 3,599,959 which permits use of a loading station, two sequential heating stations and a vacuum forming station. A sheet of plastic may be loaded, in a clamp frame, rotated to the first heating station. While heating, a second sheet is loaded. After passing through the second heat station and the forming station, the finished product arrives at the loading station, is removed, and a flat sheet loaded. Thus, a continuous operation may be maintained.

Polycarbonate plastic sheet, as exemplified by Lexan ® manufactured by General Electric, has characteristics ideally suited for use with skylights due to its superior strength and resistance to breakage. It has been found that skylights can be fabricated from polycarbonate sheet which will meet the national building codes and the burglary resistance standards of the Underwriters Laboratory. However, the above referenced apparatus are eminently suited for forming of acrylic and similar plastic sheets but were found unsatisfactory for forming skylight dome elements from polycarbonate plastic sheet. The use of such prior art techniques and machines resulted in a very low yield of satisfactory units. It has been determined that the problem stems from the relatively narrow range of temperatures over which polycarbonate sheet can be efficiently formed, and the more rapid cooling of the sheet when it is removed from the heating means. These problems show up as excessive rippling or waviness in flat perimeter flanges, and in distortion or irregularities in the dome portions. As may be recognized, polycarbonate skylight domes must be as optically clear and distortion free as possible, perimeter flanges must be flat to seal tightly against roof or curb surfaces, and, due to the higher cost of polycarbonate materials, be producible with a high yield.

The present invention is an improvement in the art of vacuum forming as applied to polycarbonate sheet in the heating and forming apparatus and methods.

SUMMARY OF THE INVENTION

The method of the present invention utilizes apparatus for forming a dome element of a skylight which provides a loading stage at which point a sheet of polycarbonate plastic is inserted and clamped in adjustable size clamp frames which securely holds the sheet around its perimeter. The clamp frames are preheated to selected temperatures before use. The clamped sheet is next subjected to a heating stage in which an oven having radiant heaters heat the clamped sheet from above and below. The oven and the heated clamp frames cooperates to raise the plastic to the required temperature for forming. The clamped sheet is then subjected to a forming stage in which co-acting perimeter molds mounted on platens are closed onto the polycarbonate sheet to form certain shapes in the perimeter area of the sheet. A vacuum is then drawn on one side of the sheet to thereby free form the center portion of the plastic sheet into a dome. Although it is quite common to form hemispherical domes, the word "dome" as used hereinafter will mean a hemisphere and all other shapes. It has been found that a satisfactory temperature for the forming and drawing operation is about 300° F. Therefore, the sheet is heated to slightly above this temperature during the heating state. It has also been found that the cooling characteristics of polycarbonate sheet permits about 10 seconds of time available for the molding and drawing operation.

It is important that the center portion and flange or perimeter portion of the sheet be maintained in the 300° F. region during the forming and molding operation. Using prior art clamping and heating means during the heating stage, it has been found that the perimeter or flange area of the sheet cannot reach the desired 300° F. region without reaching much higher temperatures in the central portion which would allow sagging and stretching of the sheet before forming, causing undesirable distortions. This problem was found to result from two circumstances. First, the necessary clamping apparatus unavoidably shields the flange area from being heated from below and partially shields that area from the upper heating elements. Therefore, less heat is introduced into the flanges by the heaters than is introduced into the central portion of the sheet. Second, the metal surfaces of the clamps act as heat sinks and tend to draw heat out of the plastic. This problem has been completely solved by providing novel heated clamp frames in accordance with the invention and by careful balancing of the heat from the clamping frames and the heat from the heaters during the heating stage.

The clamping frames are provided with internal heating elements such that the clamping surface contacted by the flange or perimeter area of the sheet are at a temperature of about 250° F. at the loading point when the sheet is first clamped. The perimeter material will then be preheated to about 250° F. when the sheet in the heated clamp frames is subjected to the oven heaters. It has been found that the time of heating in the oven heaters sufficient to raise the center portion of the polycarbonate sheet to the required 300° F. the additional heat into the flange area will also permit the oven to raise the flange temperature from the original 250° to the required 300°.

After heating of the sheet in the oven, the external heaters are removed. The heated sheet held in the clamped frame is thereafter formed to produce the skylight dome element. The heated clamping frames remain energized during forming thereby preventing the flange or perimeter area of the sheet from prematurely cooling as is the case when prior art non-heated clamping frames are used. In forming a skylight dome in the center portion of the heated and softened polycarbonate sheet, in accordance with the invention, co-acting stepped molds around the periphery of the sheet just inside the clamping frames are closed onto the sheet to form stepped areas therein into which other sheets of formed polycarbonate can be bonded to thereby form multiple dome skylights. It has been found that metal molds, which are desirable for long life and smooth surfaces, draw heat from the polycarbonate which results in localized rapid cooling of the plastic sheet and which degrades the quality of the finished skylight element. Therefore, in accordance with the invention, the male and female sections of the stepped molds are heated to prevent this undesirable cooling. After closing of the molds, the center area is subjected to a vacuum which will free form the central portion into a dome.

After forming of the dome, the platens holding the molds are opened. The now formed skylight dome element is allowed to set sufficiently to permit removal of the element from the frame. Advantageously, the maintenance of heat in the flange area during the molding and vacuum forming step and the gradual cooling occurring after forming results in a smooth, flat flange around the central dome portion of the skylight element with no ripples, waves, or other distortions therein. Furthermore, the clamp bars utilized have a plurality of shallow sharp points along the area of contact with the flange resulting in indentations around the flange. Proper spacing of these points permit these indentations to be used as guides for subsequent punching or drilling of nailing holes in the flange.

The heated molds additionally are provided with a series of tapped holes on both the inside and outside perimeters of the molds. These threaded holes provide means for mounting auxiliary push elements for certain skylight element designs. Push elements are used to form flat vertical rises in the dome as well as other shaped skylight domes. Shapes other than a standard hemispherical shape may be formed by appropriate push elements. For example, by the use of four triangular shaped push elements, a hyperbolic paraboloid may be formed which has advantages for a skylight which may be subject to heavy snow loading.

It is therefore a principal object of the invention to provide a method and apparatus for forming skylight dome elements from a polycarbonate plastic sheet with a high yield of usable elements.

It is another object of the invention to provide a method and apparatus for forming skylight dome elements from polycarbonate plastic sheet in which heated frames are used to clamp the perimeter of a blank sheet to thereby preheat the flange area such that subsequent heating of the entire sheet will maintain the flanges flat during forming of the skylight dome element.

It is still another object of the invention to provide a method and apparatus for forming polycarbonate plastic sheet into a skylight dome element having a flat flange area and a plurality of steps and pushes around the outer perimeter thereof without distortion of the plastic sheet after forming.

It is yet another object of the invention to provide heated molds for forming step regions in the outer perimeter region of a polycarbonate plastic sheet such that the temperature of said sheet is maintained at its optimum workable temperature range during the molding and forming operation.

It is a further object of the invention to provide molds having provisions for mounting of ancillary push elements for forming special contour dome areas in skylight dome elements.

It is still a further object of the invention to provide a method and apparatus to permit vacuum drawing of desired dome shapes in a sheet of polycarbonate plastic in which such drawing may be performed in a short interval of time before cooling of the plastic sheet.

It is yet a further object of the invention to provide heated clamping frames for a sheet of polycarbonate plastic to be formed into a skylight element wherein the clamping produces a plurality of indentations in the flange area as guide marks for subsequent punching or drilling of holes.

These and other objects and advantages of the invention will become apparent from the following detailed description and drawings.

DETAILED DESCRIPTION OF THE PREFERRED EMBODIMENT

Figure 1:
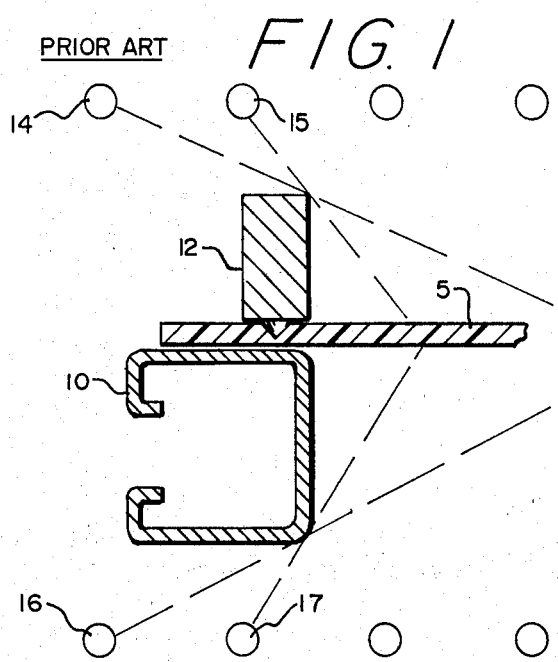
FIG. 1 is a cross sectional and partial view of a prior art clamp frame in a heating oven showing incomplete heating due to interference of the clamp frame structure.

The present invention involves apparatus and methods for forming skylight dome elements and the like from polycarbonate sheet such as supplied by General Electric Company under the trade name Lexan ®. It has been found that the apparatus and methods eminently suitable for forming of skylight dome elements and similar forms from acrylic type plastics are not suitable for the polycarbonate sheet. Further, it has been determined that the range of temperatures over which the polycarbonate sheet is workable is more narrow and critical than for other types of plastic. Referring to FIG. 1, a cross-sectional view of a portion of a typical prior art forming apparatus is shown with a plastic sheet 5 installed therein. The illustration is typical of a type of apparatus in which a square or rectangular frame 10 is set up having an outside size suitable for a particular size of plastic sheet 5. Conventionally, the sheet 5 is installed on the frame and a set of clamp bars 12 are forced down against the plastic sheet 5 by means of air operated cylinders, toggle clamps, or other clamping devices. This technique holds the perimeter of the sheet 5 tightly against the clamping frame 10. After clamping the assembly is exposed to an array of heating elements such as 14, 15, 16, and 17, usually in an oven type housing. The purpose of the heating elements is to raise the temperature of plastic sheet 5 to the point at which it becomes soft and plastic and can therefore be molded or formed into the desired shape. Therefore, after sufficient heating, the plastic sheet 5 may then be vacuum drawn, formed by molds, or by combinations of such devices.

When an attempt is made to form polycarbonate plastic sheet with the above described prior art apparatus, problems occur with respect to forming of the polycarbonate sheet with molds near the perimeter thereof and with maintaining the outer perimeter portion flat after the forming process where the perimeter portion is to be maintained as a flange for the skylight. Investigation indicated that prior art apparatus would heat the central portion of the sheet to a higher temperature than the perimeter portion as a result of the geometry as seen in FIG. 1. The frame 10 to which the sheet 5 is clamped by clamp bar 12 shields the perimeter portion from heating elements 16 and 17 as indicated by the dashed lines. Similarly, the clamp bar 12 shields the upper perimeter portion from the heat from elements 14 and 15 as also indicated by the dashed lines where such clamps are disposed. Thus, the underside of the perimeter region of sheet 5 gets very little heat due to the presence of frame 10, the perimeter region inside of frame 10 receives less heat than the central portion of the sheet 5, and the upper perimeter region receives uneven heat due to the presence of the clamp bar 12. If the assembly as shown in FIG. 1 is permitted to remain in the oven area long enough to raise the perimeter portion of the sheet to the desired molding temperature, it is found that the central portion will receive too much heat causing sagging and rippling while in the oven and during forming.

Figure 2:
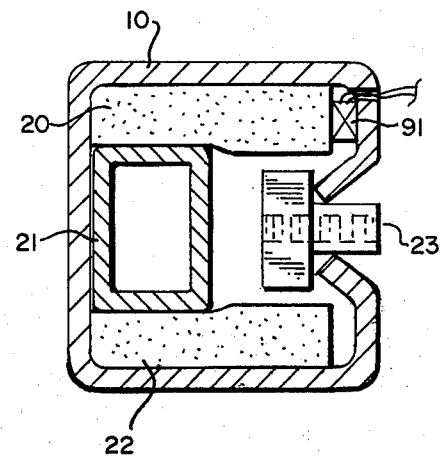
FIG. 2 is a cross sectional view of a heated clamp frame in accordance with the invention.

Advantageously, the apparatus of the invention produces even heating of the perimeter areas of the sheet in the time that it is required to raise the central portion to its required molding temperature. This is accomplished by providing heating elements in frame 10 to permit preheating of the perimeter area of the polycarbonate sheet and to maintain its temperature during the molding operation. FIG. 2 is a cross-section of the clamping frame 10 of the invention showing a silicone heating element 20 installed in contact with the top surface of the frame 10. To hold the heating element 20 in place and to permit easy replacement or change in wattage of element 20, a rectangular aluminum extrusion 21 may be used with the silicone rubber pad 22. The resilience of pad 22 and heating element 20 permit a snug fit with rectangular tubing 21. Generally, frame 10 is formed from square steel stock.

As may be understood, it is necessary to have the clamping frames adjustable to be able to accommodate a wide range of sizes of polycarbonate sheets that can be formed in the apparatus. Therefore, a threaded T-connector 23 may be provided at various locations along channel 10 and mounted to the framework of the molding machine. This mounting permits convenient changing of frame elements as needed.

Figure 3:
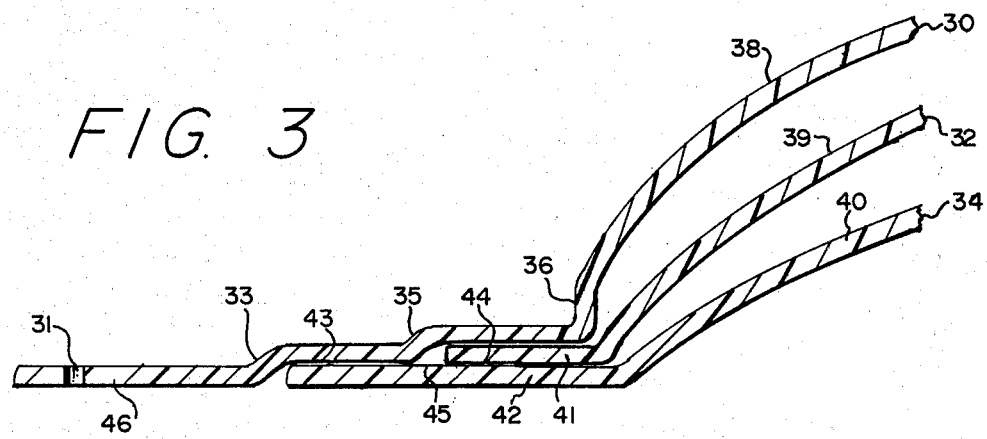
FIG. 3 is a cross sectional view of the perimeter portion of a triple dome skylight made by the method and apparatus of the invention.

In addition to heating of the perimeter area by means of the clamping frames, it has also been found desirable to provide heated molds when forming various shapes near the perimeter portion of the polycarbonate sheet. For example, FIG. 3 illustrates typical desirable shapes when forming a multiple dome skylight. Here, a first sheet of polycarbonate 30, shown partially and in cross-section near the perimeter of the sheet, requires a flat flange 46 which will extend around the entire perimeter of the outside skylight dome element, a first step 33, 43 formed at the inside boundary of the flange, a second step 35, 44 formed inside of the perimeter of step 43 and finally, a push 36 formed inside the perimeter of step 44. The domed portion 38 then extends upward from push 36. The purpose of steps 33, 43 and 35, 44 is to provide for attachment of intermediate dome element 32 and inner element 34 as shown. Intermediate dome element 32 with dome 39 is molded to have only the narrow flange 41 extending around its perimeter which fits into step 35, 44 of the outer dome element. Inner dome element 34 with dome 40 has a wide flange 42 which fits into step 33, 43 and over flange 41 of intermediate dome element 32. After forming the three elements 30, 32 and 34 in the apparatus of the invention, the two inner element flanges 41 and 42 are bonded together with outer element 30 by step surfaces 44, 45 and 43 to form a rigid triple dome skylight.

As will be discussed hereinbelow, other shapes are frequently required in the perimeter area. For example, the design shown in FIG. 3 utilizes the perimeter portion 36 of outer dome element 30 as a self-flange having nail holes 31 around the perimeter such that the skylight is made entirely of polycarbonate sheet and may be nailed to a roof opening utilizing suitable sealant, and with the flange and stepped areas then covered with the roofing material and flashing as desired. Other designs may utilize a raised curb built into the roof or skylight location in which case the flange section 46 is not required and the outer perimeter must be formed to fit the curb and to provide a drip mold to prevent water intrusion. Similarly, a double dome skylight may be formed requiring only one step, and a skylight having four domes may be formed by providing three steps.

Figure 4:
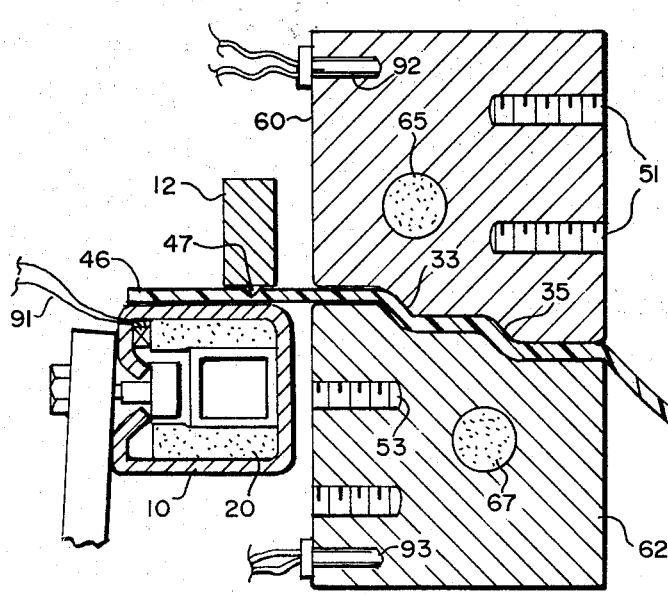
FIG. 4 is a cross section through a heated clamp frame and a pair of heated molds in accordance with the invention.

Turning now to FIG. 4, a cross-sectional view of the heated clamp frame 10 with a pair of co-acting molds 60 and 62 in accordance with the invention are shown with a polycarbonate sheet 30 clamped to heated clamping frame 10 by clamp 12. In order to form steps 33 and 35 efficiently, it has been found necessary to preheat mold sections 60 and 62. Therefore, heating elements 65 and 67 have been provided as shown. The heated mold 60 and 62 ensure that polycarbonate sheet 30 will remain at the required molding temperature throughout the molding process as will be discussed more fully below. It may be noted that push 36 of FIG. 3 is not shown in FIG. 4. Push 36 has been found necessary in the triple dome design of FIG. 3 when a relatively high dome rise is required to permit intermediate dome 39 to properly fit in step 35. When a low dome profile such as shown in FIG. 4 is used push 36 is not required.

Figure 5:
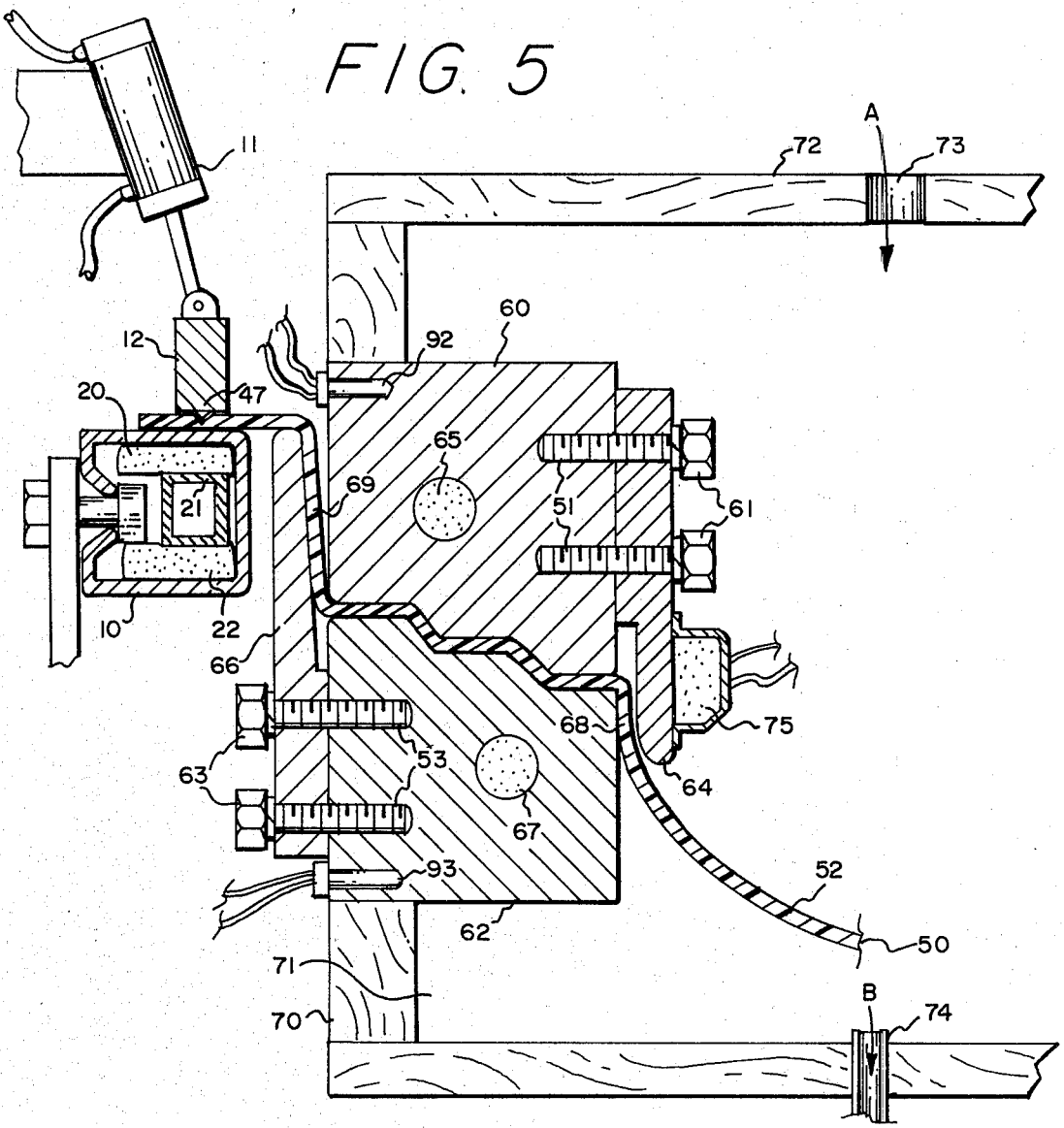
FIG. 5 is a cross section through a heated clamp frame, a pair of heated molds, and a vacuum drawing box in which interchangeable push bars are shown attached to the molds.

It is a feature of the invention to minimize the number of molds such as 60 and 62 required for various designs. Therefore, the arrangement of FIG. 5 is provided. Tapped holes 51 and 53 in molds 60 and 62 are utilized to mount various push elements such as push element 64 and push element 66 shown in FIG. 5. A heating element 75 may be attached to a push bar such as push bar 64 if found necessary to provide an undistorted push, for example, such as push 68. Additional details of the forming apparatus is shown in FIG. 5 are a vacuum box 70 attached to the lower mold 62 and an inlet box 72 shown attached to the upper mold 60. Polycarbonate sheet 50 is clamped to heated clamp frame 10 by clamp bar 12 with pressure provided by a pneumatic cylinder 11. Point 47 on clamp bar 12 bears on the perimeter area of sheet 50 such that as heat is applied to the sheet and it becomes softened, point 47 will partially penetrate to prevent subsequent molding and forming forces from causing the sheet to pull out from the clamps. When the dome element being formed is to be a self-flanged type as shown in FIG. 3 and FIG. 4, the clamp marks formed by point 47 may be conveniently used for drilling or punching of nail holes therein. The mold assembly of FIG. 5 is for an outer skylight dome element having a push 68 as well as push 69. Push 69 is to permit mounting of skylight element 50 on a curb. In such case, the outer perimeter area of sheet 50, which is shown clamped to heated clamping frame 10, will be trimmed after completion of molding of the dome element 50.

Figure 6:
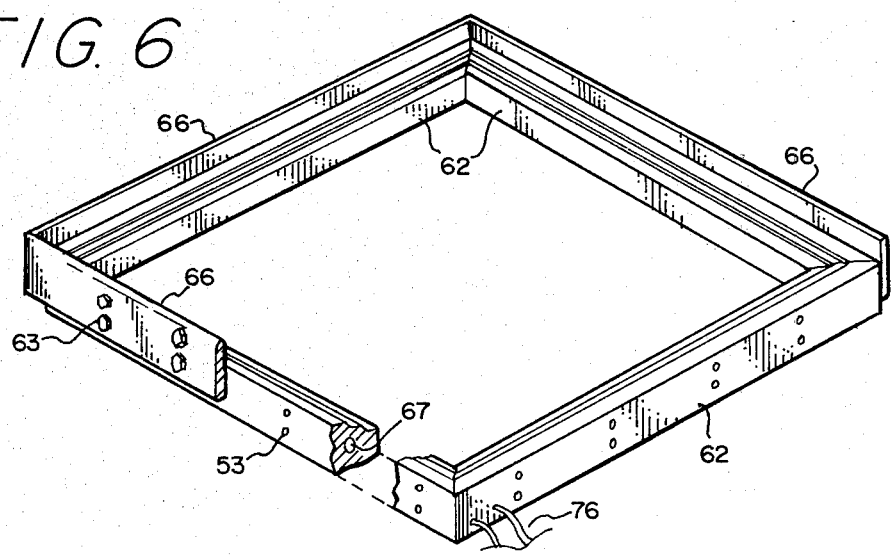
FIG. 6 is a perspective view, partially cut away, of one of the heated molds of FIG. 5.

FIG. 6 is a perspective view of the mold platen 62 partially cut away as set up to form a square skylight dome element. Push bar 66 has been cut away and omitted partially from the front left mold portion and the right mold portion. Push bar 66 is attached by means of bolts 63 in threaded holes 53. Thus, various sizes and shapes of push bars may be used in accordance with the particular design being molded. Leads 76 supply power to heater 67 in mold platen 62.

Figure 7:
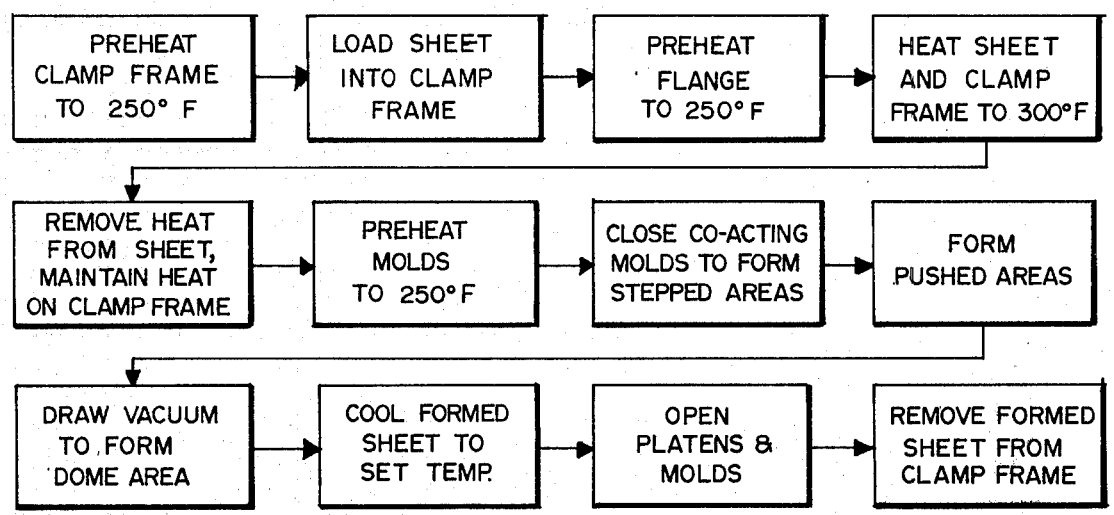
FIG. 7 is a work flow diagram of the method of the invention.

Having now described in detail the novel features of the present invention, the method of forming domed skylight elements and the like from polycarbonate sheet will be described with reference to the work flow diagram of FIG. 7 and the apparatus views of FIGS. 5 and 6. Assuming that polycarbonate sheet 50 has been trimmed to the desired size, clamp frame 10 is then preheated to a preselected temperature. The temperature to which the clamp frame and the polycarbonate sheet perimeter is to be preheated is influenced by several factors. These include: thickness of plastic sheet; size of plastic sheet; and time of oven heat cycle. Therefore, manual and automatic controls are provided. For example, a thermistor or similar temperature sensing element is attached to the clamp frame and connected in a manually adjustable electronic control circuit. For a given size and thickness of polycarbonate sheet, test formings are made and the clamp frame temperature is varied manually until flat, even flange areas are obtained. Thereafter, the temperature controller is adjusted to maintain such predetermined temperature. For purposes of further description, a nominal value of 250° F. will be used for preheating of clamp frame and polycarbonate sheet. After such preheating, sheet 50 is mounted on frame 10 and air cylinders 11 energized to force clamp bars 12 onto the perimeter of sheet 50 with points 47 partially penetrating the sheet. The flange or perimeter portion of sheet 50 will then be preheated to 250° F. at which point heat is applied to the upper and lower faces of polycarbonate sheet 50. In some machine arrangements, heaters are moved into place above and below the clamping frames 10 while in other types the frame is moved from a loading station into a heating station with the frame moved between the upper and lower ovens. The amount of heat produced in the heating step is selected to raise the temperature of the central portion of sheet 50 to about 300° F. and at the same time provide sufficient additional heat to the perimeter area to raise the perimeter area to about 300° F. During the preceding steps, power is turned on to the heating element 65 and 67 in the molds 60 and 62 and the temperature of the molds is maintained at about 250° F. by means of thermostatic controls. After initial start up of a run of skylight dome elements, the temperatures of the clamp frames and molds will become stabilized and the heating elements are thereafter maintained energized continuously. The heated sheet 50 in clamp frame 10 is then positioned over the lower mold box 70 and the upper box 72 is positioned above sheet 50. It has been found that the central portion of sheet 50 will maintain the desired 300° F. temperature for approximately 10–12 seconds, depending upon the size and thickness of the sheet. Therefore, it is necessary to perform the molding operation and forming operation within these time limits to ensure a high quality product. To co-acting molds 60 and 62 are then closed with push bars 66 and 64 and forming push 68 and vertical portion 69 and molds 60 and 62 forming the steps as shown, leaving the central portion of sheet 50 flat. As shown as the molds are closed, a vacuum is drawn via outlet 74 of vacuum box 70 drawing air out as shown by arrow B. Atmospheric pressure is allowed into the upper box as shown at A via opening 73. The vacuum free forms an approximately spherical shaped dome 52 with the height of the dome controlled by cutting off the vacuum at the appropriate time. Any well known method such as a photo cell, microswitch, or similar sensor may be utilized to cut the vacuum off. It has been found that several pulses of vacuum are effective in obtaining a smooth, undistorted dome area 52.

During the step of closing the co-acting molds, the flange or perimeter area is maintained at about 300° F. since the heaters 20 in clamping frames 10 are still energized. Therefore, the stretching and forming of the step areas does not cause rippling or waviness in the flange as will occur when non-heated clamp frames are used as in the prior art. Similarly, the step of preheating the molds 60 and 62 prevent rapid drawing of heat from the preheated sheet 50 as the mold elements come together as will occur in prior art machines since the temperature of the molds will be considerably lower than that of the sheet. Thus, having the molds 60 and 62 at nearly the same temperature as sheet 50 ensures that the sheet will remain soft and plastic throughout the forming step.

Additionally, such preheating also prevents the mold elements from drawing heat from the edges of the dome area 52 which could cause distortion in that area when the vacuum is applied. As soon as the molds close and the dome is properly formed by the vacuum and vacuum box 70, the mold boxes remain closed and the polycarbonate dome element permitted to cool below the plastic point of the polycarbonate sheet. After the molding and forming operation is completed, and before the molds are separated and the clamps on the clamping frame are released, the formed skylight dome element will begin to cool. Generally, the dwell time of a rotary system is controlled by the length of the oven heating portion of the cycle. The forming time is short and therefore, a cooling period is available after forming and prior to rotating the formed element to the loading/unloading station. As previously discussed, polycarbonate sheet will cool and set quickly compared with the acrylics, and generally within 10 to 12 seconds. After initial cooling, the molds are then separated, the clamps 12 are released and the formed dome element is removed from the clamp frame. This step completes the cycle at which point the clamp frame can be loaded for another cycle.

As may now be seen, the novel elements of the present invention are as follows: a heated clamp frame for clamping the perimeter of a polycarbonate sheet to prevent warping and waviness in the clamped area after fabrication of a skylight dome element; co-acting molds for forming required steps in the perimeter area of a polycarbonate sheet having heating elements to permit preheating of the molds, to prevent cooling of the sheet during the molding operation and thereby preventing distortion in the finished skylight dome element; the mold sections each having provision for mounting a variety of different push elements for forming desired shapes in the plastic sheet; and push bars for attachment to the mold sections. It is clear that the improved apparatus of the invention may be utilized with various commercially available molding machines which provide adjustable frameworks for installing the clamp frame and the mold boxes, for the heating oven, for the vacuum pump and control, and for mechanisms for opening and closing the platens and mold boxes. A preferred type of machine is the so-called rotary design having, for example, three rotating clamping frames. Thus, a first frame can be loaded at a loading station, then rotated into an oven at a heating station. A second frame is then available for loading during the heating of the first loaded frame. Then the heated frame and sheet is rotated to the vacuum and forming station with the second frame and sheet rotated to the heating station while loading the third frame at the first station. Thus, a continuous loading, heating, forming and unloading operation may be carried on for a high production rate.

Figure 8:
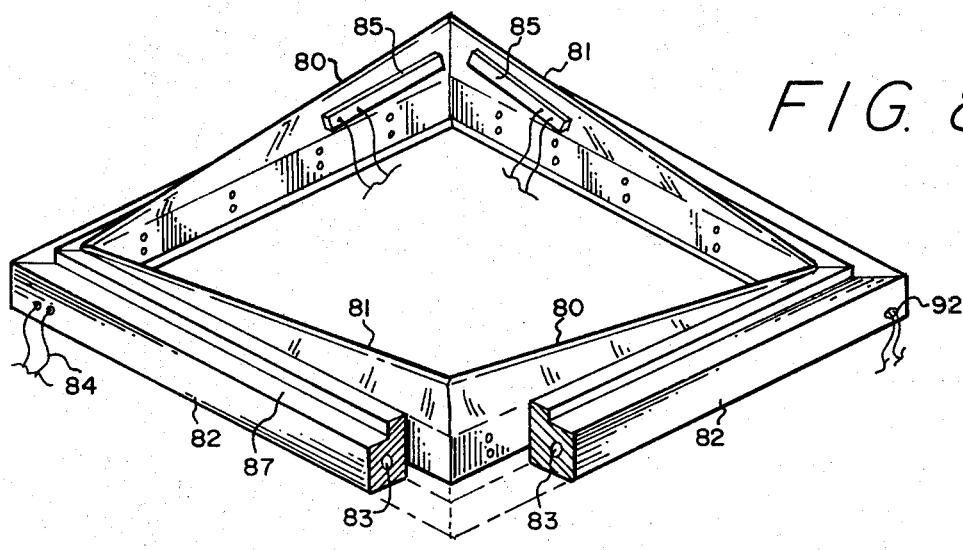
FIG. 8 is a perspective view, partially cut away, of a heated mold having triangular push bars attached thereto for forming a skylight dome element having a hyperbolic paraboloid shape.
Figure 9:
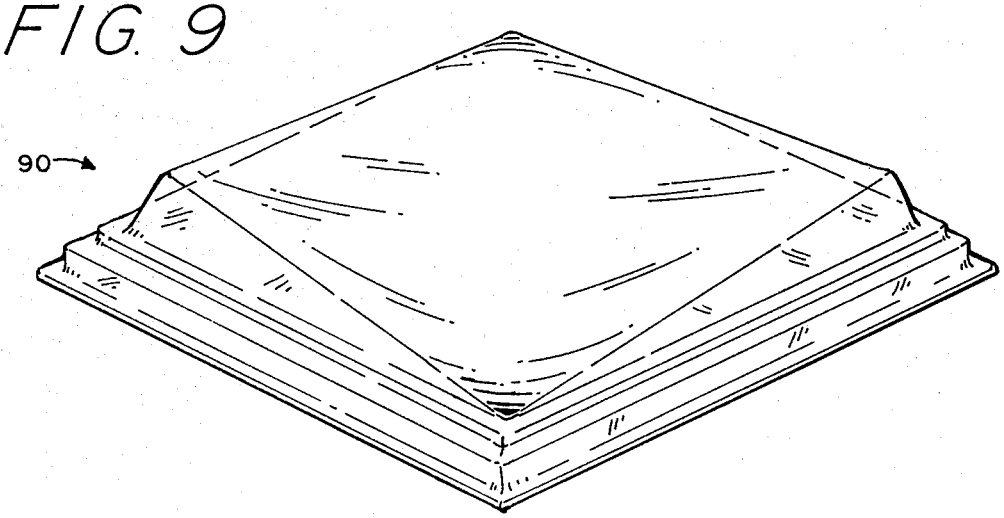
FIG. 9 is a perspective view of a finished polycarbonate plastic dome element having a hyperbolic paraboloid shape and adapted for curb mounting.

The examples given above for forming a dome element for a skylight from polycarbonate sheet illustrated the forming of spherical type dome as a result of drawing the hot plastic sheet when it is clamped around the four edges thereof. Advantageously, the novel design of the molds which permits attachment to interchangeable push bars allows other desirable dome shapes to be formed with the assistance of specialized push bars. An example is given with reference to FIG. 8 and FIG. 9 for forming a dome in the shape of a hyperbolic paraboloid. This shape has a strength equal to that of a free formed dome with a rise about twice that of the hyperbolic paraboloid. Thus, a much lower profile dome may be used where desirable without sacrificing the low profile capability. For example this design is especially suitable where heavy snow loads can occur on a skylight. FIG. 9 illustrates a hyperbolic paraboloid skylight dome element 90 as produced by a set of co-acting molds with special push bars attached thereto. In FIG. 8 a mold 82 which corresponds to mold 62 of FIG. 5 is shown having a single step rather than the double step of FIG. 5. Mold 82 is inverted and a set of triangular push bars 80 and 81 is bolted to mold 82. The matching co-acting mold (not shown) will include a push bar 66 and will therefore represent mold 62 of FIG. 5 inverted. In this case, as the co-acting molds are closed, the platic sheet is forced upward at two opposite corners at which point the vacuum is introduced into the vacuum box which pulls the central part of the plastic sheet downward against the edges of the push bars 80, 81 to thereby form a hyperbolic paraboloid shape as may be shown mathematically. It is to be noted that the push bars 80, 81 are bent inward at about 30° to produce the desired shape. Depending on the rise desired, heating elements 85 may be externally attached to the inside surfaces of push bars 80 and 81 at a position not to interfere with the vacuum forming step but to ensure smooth distortion free edges of the polycarbonate sheet where it contacts push bars 80 and 81. As may be recognized, the use of a push bar 66 in FIG. 5 with the platen mold section shown in FIG. 8 produces skylight dome element 90 having vertical portions around the perimeter which permit the dome to be installed on a raised curb. Removing of the push bar 66 will result in a form of the type shown in FIG. 4 which may then be utilized as a self-flanged dome mounted directly on a roof.

An important advantage of the apparatus of the present invention is therefore that a wide variety of skylight dome elements may be formed from a minimum number of molds and push bsrs, and the expense of a special set of molds for every desired style of dome is eliminated.

Although certain specific embodiments of the apparatus and steps of the method of the invention have been shown, such are for exemplary purposes only and many variations and substitutions will be apparent to those of skill in the art, and will be considered to fall within the spirit and scope of the invention.

We claim:
1. A method for forming skylight dome elements and the like in a polycarbonate plastic sheet utilizing apparatus having a heated clamp frame for clamping the perimeter of the plastic sheet, an oven for heating the plastic sheet, coacting perimeter molds to form stepped areas in the plastic sheet adjacent to the perimeter of the sheet, and a vacuum mold for forming a dome area in the plastic sheet, comprising the steps of:

preheating the clamp frame to a first temperature prior to use;

clamping a sheet of polycarbonate plastic around its perimeter region in the clamp frame;

preheating the perimeter region of the polycarbonate plastic sheet approximately to the first temperature by means of the preheated clamp frame;

heating the remainder of polycarbonate plastic sheet and clamp frame in the oven to a second temperature higher than the first temperature but lower than a temmperature which would permit the polycarbonate plastic sheet to sag, the first temperature having been selected to permit the perimeter region and the remainder of the polycarbonate plastic sheet to reach the second temperature at about the same time;

preheating the coacting perimeter molds to approximately the first temperature;

closing the preheated molds on the heated polycarbonate plastic sheet to form stepped areas therein immediately adjacent the clamp frames; and drawing a vacuum on one surface of the heated polycarbonate plastic sheet to thereby form a dome therein.

2. A method for forming skylight dome elements and the like in a polycarbonate plastic sheet utilizing apparatus having a heated clamp frame for clamping the perimeter of the plastic sheet, an oven for heating the plastic sheet, perimeter molds to form stepped areas in the plastic sheet adjacent to the perimeter of the sheet, and a vacuum mold for forming a dome area in the plastic sheet, comprising the steps of:

preheating the clamp frame to a first temperature prior to use;

clamping a sheet of polycarbonate plastic around its perimeter region in the clamp frame to form a flat flange;

preheating the perimeter region of the polycarbonate plastic sheet to a first temperature slightly below the molding temperature of the plastic sheet by means of the preheated clamp frame;

introducing the clamped and preheated polycarbonate plastic sheet into the oven;

heating the remainder of the polycarbonate plastic sheet and the clamp frame to a second temperature slightly higher than the molding temperature of the plastic sheet and less than a temperature which would permit the unclamped portion of the sheet to sag;

moving the clamping frame and polycarbonate plastic sheet from the oven to a position between coacting perimeter molds;

preheating the perimeter molds to approximately the first temperature;

closing the coacting preheated perimeter molds on the heated polycarbonate plastic sheet to form stepped areas therein just inside of the clamp frame;

drawing a vacuum on one surface of the heated polycarbonate sheet to thereby form a dome therein; and opening the molds for removal of the formed polycarbonate plastic skylight dome element.

3. The method as defined in claim 1 or 2 which include the additional step of:

attaching a set of push bars to the molds prior to the step of preheating the clamp frame to a first temperature; and in which the step of closing the co-acting preheated molds on the heated polycarbonate sheet also forms pushes in the heated polycarbonate plastic sheet.

4. The method as defined in claim 1 or 2 in which the step of drawing a vacuum on one surface of the heated polycarbonate sheet forms an essentially hemispherical shaped dome.

5. The method as defined in claim 3 in which the step of attaching a set of push bars to the mold includes the steps of:

attaching a set of essentially triangular push bars to the mold in which the push bars form a selected acute angle with respect to the plane of the polycarbonate plastic sheet; and in which the step of drawing a vacuum on one surface of the heated polycarbonate sheet forms a hyperbolic paraboloid shaped dome therein.

6. The method as defined in claim 1 or 2 in which:

the step of preheating the perimeter region of the polycarbonate plastic sheet heats same to about 250° F.; and the step of heating the polycarbonate plastic sheet and clamp frame to a second temperature heats the same to about 300° F.

7. A method for forming skylight dome elements and the like in a polycarbonate plastic sheet utilizing apparatus having a clamp frame for clamping the perimeter of the plastic sheet to form flange portions, an oven for heating the plastic sheet, coacting molds to form stepped areas in the plastic sheet, and a vacuum mold for forming a dome area in the plastic sheet, comprising the steps of:

providing heating elements in the clamp frame;

preheating the clamp frame to a first temperature prior to insertion of a plastic sheet therein;

clamping a trimmed sheet of polycarbonate plastic around its perimeter region in the clamp frame to form a flange portion;

preheating the perimeter portion of the polycarbonate plastic sheet to the first temperature by the heating elements in the clamp frame;

exposing the clamped polycarbonate plastic sheet and the clamp frame to heat from the oven;

heating the unclamped portion of the polycarbonate plastic sheet and the clamp frame to a second temperature higher than the first temperature wherein the first temperature is selected to permit the entire plastic sheet to reach the second temperature at about the same time;

preheating the coacting molds to approximately the first temperature;

introducing the heated clap frame and the heated polycarbonate plastic sheet, after heating in the oven, to a position between the coacting molds;

closing the coacting preheated molds on the heated polycarbonate plastic sheet to form stepped areas therein around the periphery of the sheet immediately adjacent the perimeter portion;

drawing a vacuum on one surface of the heated polycarbonate sheet to thereby free-form a dome therein; and opening the coacting molds for removal of the formed polycarbonate plastic skylight dome element.

8. The method as defined in claim 7 in which the first temperature is slightly below a desired molding temperature for the polycarbonate plastic sheet and the second temperature is slightly higher than the desired molding temperature and lower than a temperature which would permit the sheet to sag.

9. The method as defined in claim 7 in which the first temperature is about 250° and the second temperature is about 300°.

10. The method as defined in claim 7 in which the clamping step includes the step of partially penetrating the perimeter portion with points attached to the clamp frames for securing the flange portion of the plastic sheet and for marking the portions of nail holes.

11. The method as defined in claims 1, 2 or 7 which comprises the further steps of:

test forming skylight dome elements with the size, thickness and composition of the polycarbonate plastic sheet;

determining therefrom a first temperature value which produces flat, even flange areas in the perimeter region; and controlling thereafter the first temperature to the determined value.

* * * * *